United States Patent [19]
Mathieus

[11] Patent Number: 5,570,712
[45] Date of Patent: Nov. 5, 1996

[54] ROTATING NOZZLE

[76] Inventor: George J. Mathieus, 498 Turkey Ranch Rd., Goldendale, Wash. 98620

[21] Appl. No.: 546,358

[22] Filed: Oct. 20, 1995

Related U.S. Application Data

[62] Division of Ser. No. 396,562, Mar. 1, 1995.
[51] Int. Cl.⁶ ..................................................... B08B 3/02
[52] U.S. Cl. .......................... 134/172; 134/198; 134/181; 239/246
[58] Field of Search ..................................... 239/246, 249, 239/558; 134/198, 172, 181, 174, 176, 179

[56] References Cited

U.S. PATENT DOCUMENTS

| | | |
|---|---|---|
| 3,120,346 | 2/1964 | Willhoite . |
| 3,447,966 | 6/1969 | Manno . |
| 3,576,222 | 4/1971 | Acheson et al. . |
| 4,439,954 | 4/1984 | Bennett . |
| 4,715,538 | 12/1987 | Lingnau . |
| 4,715,539 | 12/1987 | Steele . |
| 4,744,517 | 5/1988 | Iwamoto et al. . |
| 4,806,172 | 2/1989 | Adaci et al. .............................. 239/550 |
| 4,821,961 | 4/1989 | Shook . |
| 5,024,382 | 6/1991 | Shook et al. . |
| 5,217,163 | 6/1993 | Henshaw . |
| 5,242,113 | 9/1993 | Manderson . |
| 5,248,092 | 9/1993 | Rankin . |
| 5,248,095 | 9/1993 | Rankin et al. . |
| 5,263,504 | 11/1993 | Bailey et al. . |
| 5,316,218 | 5/1994 | Bowen .................................... 239/246 |
| 5,402,936 | 4/1995 | Hammelmann . |
| 5,485,961 | 1/1996 | Reitzig .................................... 239/246 |

FOREIGN PATENT DOCUMENTS 3623368   9/1987   Germany .

OTHER PUBLICATIONS

NLB Corp.; 1989; Spin–Nozzle brochure (Model No. SRH 20–77).

Primary Examiner—Frankie L. Stinson
Attorney, Agent, or Firm—Graybeal Jackson Haley & Johnson

[57] ABSTRACT

In a first embodiment, a high pressure fluid blaster includes a rotating nozzle which has a plurality of separate fluid jet orifices. The fluid jet orifices are geometrically configured such that rotation of the nozzle in a single direction, i.e. clockwise, results in the desired metal cleaning or stripping. The plurality of jets are divided into two or more sets, each set having at least one jet therein, with the jets in each set oriented at a different angle from the jets in the other sets. This configuration will produce tubular streams of fluid as the nozzle rotates such that the streams first converge, then intersect, and finally diverge. As the jet streams are applied to a surface after the streams have diverged, they score the surface with concentric circular grooves due to the force of the high pressure fluid. Importantly, the force of the high pressure fluid does not just score the surface with these concentric circles, but the areas between these concentric circles are also blasted clean due to tangential fluid forces.

A second embodiment of the present invention is configured substantially identically to the first embodiment except that the different jet sets are all aligned at substantially the same angle from the central axis of the nozzle such that the fluid streams emanating from the jet sets only diverge, and never converge or intersect.

13 Claims, 6 Drawing Sheets

ROTATING NOZZLE

This is a divisional of the prior application Ser. No. 08/396,562, filed Mar. 1, 1995, the benefit of the filing dates of which are hereby claimed under 35 USC 120.

BACKGROUND OF THE INVENTION

The invention pertains to rotating fluid nozzles, and more specifically to rotating fluid nozzles for delivery of highly pressurized fluid to strip or clean a desired surface. It is to be understood that the term "clean" as used herein means to remove attached debris such as dirt, grease, oxides, and calcifications, for example, from the surface being worked. It is also understood that the term "strip" as used herein means to remove the exterior layer of molecules comprising the work surface itself.

Numerous fluid nozzles for operating on a surface are disclosed in the prior art. U.S. Pat. No. 4,821,961 issued to Shook discloses a self-rotating nozzle having a hollow shaft adapted for connection to a source of pressurized fluid. A body has an axial bore upon a central axis secured over one end of the shaft and has a counterbore. The shank with an end position extends from the body into which the counterbore extends with the counterbore terminating in a pair of radial ports. A head bears against the body and is journaled upon the shank. A fastener upon the end portion retains the head against axial movement relative to the body. A pair of spaced jet flow orifices are mounted upon outer portions of the head extending generally parallel to the central axis, but on oppositely extending axes inclined at a small acute angle to axes parallel to the central axis to provide a balanced rotational reactive power torque to the head. A pair of fluid passages in the head communicates with the ports and with the orifices respectively. The orifices are adapted to provide high velocity streams of pressurized fluid to a surface to be cleaned.

U.S. Pat. No. 5,024,382 issued to Shook et al. discloses a self-rotating nozzle substantially similar to the nozzle of U.S. Pat. No. 4,821,961 just discussed, except that the self-rotating nozzle of U.S. Pat. No. 5,024,382 discloses a pair of spaced jet flow orifices that are mounted upon outer portions of the head extending generally parallel to the central axis, but on oppositely extending axes canted at a small acute angle to axes parallel to the central axis to provide a balanced rotational reactive power torque to the head.

U.S. Pat. No. 5,217,163 issued to Henshaw teaches a rotating head mounted on a nozzle which creates cavitation in a pressurized fluid such that a surface may be quickly and efficiently cleaned. The rotation of the nozzle ensures a relatively wide cleaning path. The cavitation allows cleaning using only the pressurized fluid jet without any abrasive. The cavitating jet nozzle includes a pin received at a central position which lowers the pressure of the pressurized fluid such that cavitation bubbles form in the fluid. The pin is self-centering within the nozzle since it is free floating relative to a securing member which retains the pin in the nozzle. In addition, the pin preferably has an end face upstream of an outlet portion of the nozzle.

U.S. Pat. No. 5,248,092 issued to Rankin discloses a pulsating nozzle which includes a rotating head driven by reaction forces of high pressure water passing through outlets disposed at an angle to a plane normal to the axis about which the head rotates, and through a plurality of spaced passages extending partially circumferentially with respect to the axis.

U.S. Pat. No. 5,248,095 issued to Rankin et al. teaches a rotating nozzle for a high pressure water blasting system comprising a rotating body mounted on a fixed shaft having a high pressure water passage therein and adapted to discharge a stream of high velocity water through the nozzle opening in the body. The high pressure water passage is inclined relative to the longitudinal axis of the rotating body to direct the discharge from the nozzle in a circular path when the body is rotated.

U.S. Pat. No. 3,576,222 issued to Acheson et al. discloses a drill bit for the drilling of wells or the like in the earth by pressurized hydraulic fluid. A plurality of nozzles 54 extend downwardly through the bottom member 50 and backsplash plate 52 of a drill bit 46. The outlets of nozzles 54 are substantially in the plane of the lower surface of the backsplash plate. It is essential to this invention that the plurality of nozzles 54 slope downwardly in a direction having a component in a direction opposite to the desired direction of rotation of the drill bit 46, and that either no nozzles slope downwardly in the direction of rotation of the drill bit or the number of nozzles sloping in the direction of rotation is small enough that the reactive forces from the nozzles is overcome by the reactive force from nozzles sloping opposite the direction of rotation. Actually, nozzles sloping downwardly in the direction of rotation are detrimental to this invention in that they reduce the torque available to rotate the drill bit, and it is preferred that all of the nozzles slope to encourage rotation in the same direction. The nozzles may be sloped outward outwardly or inwardly as well as downwardly and in a direction opposite to the direction of rotation, as illustrated by nozzle 54a in FIG. 2. To provide an effective reaction force tending to rotate the drill bit, the slope of most of the nozzles sloping in a direction opposite the direction of rotation of the drill bit should be substantial, for example, at an angle of at least twenty degrees with the vertical. The maximum slope is limited largely by the space available. It is important to note that in Acheson, while the nozzles are angled, they appear to all be angled the same amount from the central axis, or are arbitrarily angled, in order to cause nozzle head rotation. Additionally, and most importantly, the Acheson nozzles are configured to form a solid water stream that impinges against the entire work surface. The nozzles 54 are positioned to impinge against substantially the entire bottom of the borehole as the drill bit rotates. The desired object of impinging against the entire bottom of the borehole may, for example, be obtained by locating nozzles, such as nozzles 54b and 54c, on one radius and nozzles 54d, 54e and 54f on another radius at different distances from the center of rotation. The angles and directions in which the nozzles slope downwardly can be varied to accomplish the desired object of impinging against substantially the entire bottom of the borehole in each revolution of the drill bit. Some of the nozzles, for example nozzle 54f, can be vertical.

A need thus exists for a rotating nozzle for use in cleaning or stripping a surface which includes a plurality of sets of jets with each of the sets of jets being disposed at a different distance from the center of the nozzle such that the nozzle produces a plurality of substantially circular concentric jet stream patterns which result in entire areas of the surface between adjacent circular concentric jet stream patterns being cleaned or stripped by the high pressure fluid streams after they initially impinge on the surface in the concentric circular patterns and as they are angularly deflected therefrom.

A need further exists for the above type of rotating nozzle wherein the sets of jets are configured at acute angles from the center of the nozzle and these acute angles and the different distances of the sets of jets from the center of the nozzle are selected such that the separate high pressure fluid streams for each of the sets of jets first converge, then intersect and finally diverge prior to impinging upon a surface to be cleaned or stripped.

A need finally exists for the above type of rotating nozzle wherein the acute angle of each of the sets of jets is different than the acute angle of the other sets of jets, and the different distances of the sets of jets from the nozzle's center are inversely proportional to the size of the acute angles of the sets of jets such that the set of jets having the largest angle is the shortest distance from the center of the nozzle and the set of jets having the smallest angle is the greatest distance from the center of the nozzle.

SUMMARY OF THE INVENTION

The invention is a rotating nozzle for high pressure (between about 20,000 and about 45,000 psi) fluid cleaning or stripping of a surface. High pressure fluid blasting is used instead of sand blasting to clean from surfaces, such as metal, chemicals such as paints and contaminants such as oxides and minerals, or to strip the surface down to bare metal. In a first embodiment, the rotating nozzle of the present invention has a plurality of separate fluid jet orifices. The fluid jet orifices are geometrically configured such that rotation of the nozzle in a single direction, i.e. clockwise, results in the desired metal cleaning or stripping. The plurality of jet orifices are divided into two or more sets, each set having at least one jet orifice therein with the jet orifices in each set oriented at a different angle than the jet orifices in the other sets. For example, the fluid jet orifices can be configured on the nozzle such that a first set comprised of a first orifice and a second orifice (preferably aligned on the opposite side of the nozzle from the first orifice for nozzle stability during rotation) are both at a precise angle from the central axis of the orifice, for example ten degrees. A second set of preferably opposite orifices are configured at a second, larger, angle from the central axis of the nozzle than the angle of the first set of orifices, for example twelve degrees. A third set of orifices is located at an angle from the central axis of the nozzle that is greater than the angle of the second set of orifices by the same increment, i.e., the exemplary two-degree increment, such that this third set of orifices is located at an angle of fourteen degrees from the central axis of the nozzle. All of the sets of orifices are located at different distances from the central axis of the nozzle. This orifice distance preferably is inversely proportional to the size of the orifice angle such that the orifice set having a larger angle is a shorter distance from the nozzle central axis, and the orifice set having a smaller angle is a greater distance from the nozzle central axis.

It is to be noted that the total number of jet orifice sets, the number of jet orifices in each set, the angles of the jet orifices in each set from the central axis, the distances of the orifice sets from the central axis, and the incremental difference between the angles of the respective orifice sets are all exemplary and can be varied. For example, instead of three orifice sets with each orifice set having two orifices, four orifice sets with each orifice set being comprised of three orifices can be employed. Additionally, instead of the angles being between twelve degrees and eighteen degrees, the angles can be anywhere from about 6 degrees to about 30 degrees. Also, instead of two-degree increments, increments from about 1 degree to about 10 degrees, for example, can be employed.

Referring again to the example wherein three two-orifice sets are employed with each orifice set being aligned between ten degrees and fourteen degrees and the incremental difference between orifice sets being two degrees, this configuration will produce three tubular streams of fluid as the nozzle rotates such that the three streams first converge with the ten-degree stream on the outer periphery and the fourteen-degree stream on the inner periphery, the three streams then coincide at a particular distance, and the three streams then diverge with the outer stream being the fourteen-degree stream and the inner stream being the ten-degree stream. As the jet streams are applied to a surface after the streams have diverged, the outer fourteen-degree stream, middle twelve-degree stream and inner ten-degree stream score the metal surface with three concentric circular grooves due to the force of the high pressure fluid. Importantly, the force of the high pressure fluid does not just score the metal with these three concentric circles, but the areas between these concentric circles are also blasted clean due to tangential fluid forces from fluid that is angularly deflected from the concentric circular patterns on the surface. Thus, a ring having an outer periphery of the fourteen-degree jet and an inner periphery of the ten-degree jet is blasted clean on the metal. Moving the nozzle horizontally across the work surface will produce a plurality of overlapping rings that result in cleaned or stripped surface, depending upon the fluid pressure and nozzle distance from the surface. It is important to note that increasing the distance between the nozzle and the work surface increases both the size of the concentric jet circles and the distance between these concentric jet circles thereby increasing the amount of work surface that can be cleaned in one pass. However, by increasing the distance between the nozzle and the work surface, the force of the fluid is decreased and tougher deposits may not successfully be removed in one pass.

A second embodiment of the present invention is configured substantially identically to the first embodiment except that the different orifice sets are all aligned at substantially the same angle from the central axis of the nozzle such that the fluid streams emanating from the orifice sets of the nozzle only diverge, and never converge or intersect.

BRIEF DESCRIPTION OF THE DRAWINGS

A more complete appreciation of the invention may be had by reference to the accompanying drawings illustrating preferred embodiments of the invention to be described in detail, wherein:

FIGS. 9a through 9e are schematic front views of the jet stream cleaning or stripping pattern produced by a rotating nozzle of the present invention having four sets of jets.

DETAILED DESCRIPTION OF THE PREFERRED EMBODIMENTS

Figure 1:
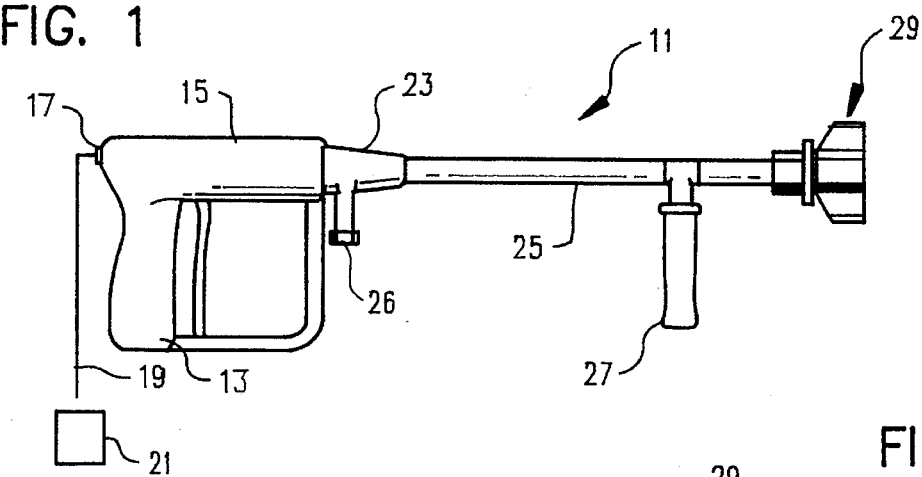
FIG. 1 is a partial perspective view and partial block diagram of an exemplary high pressure fluid apparatus with which the rotating nozzle of the present invention can be employed.

FIG. 1 shows an exemplary water blaster or gun 11 for supporting and mounting the rotating nozzle assembly 29 of the present invention. Gun 11 includes a support grip 13 with overlaying pressure chamber 15 having hose fitting 17 adapted for connection to a pressure hose 19 extending from a pump and tank assembly 21 shown schematically in FIG. 1. The pump and tank assembly 21 includes a pump and reservoir for delivering fluid, such as water, at pressures from about 20,000 psi to about 45,000 psi.

Pressure chamber 15 terminates in an outlet fitting 23 into which projects one end of powered rotary barrel or hollow shaft 25 which is secured thereto by, for example, screw 26 or other fastening means.

Figure 2:
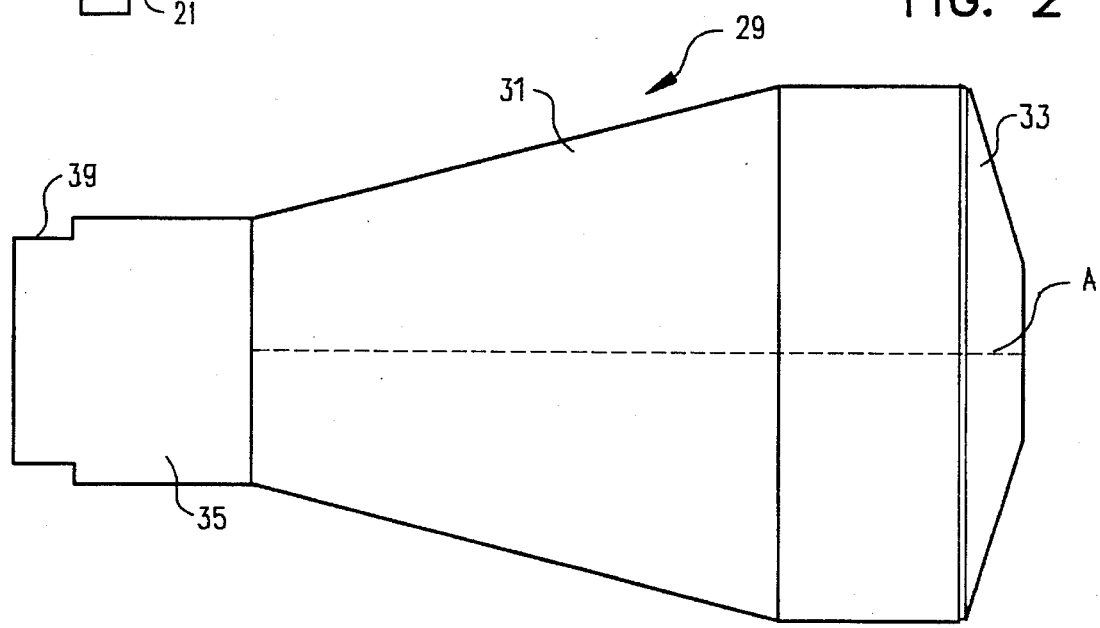
FIG. 2 is a side view of the rotating nozzle of the present invention.
Figure 3:
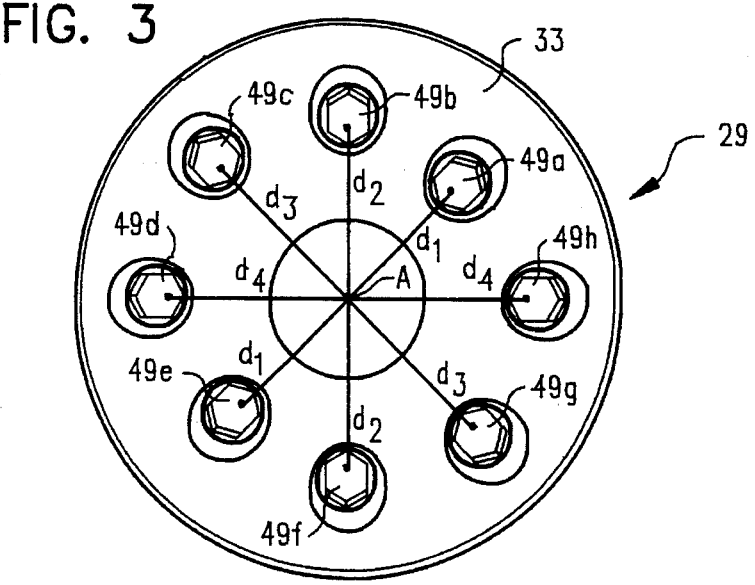
FIG. 3 is a front view of the rotating nozzle of the present invention.

Mounted upon the other end of the shaft 25 is rotating nozzle assembly 29 having a longitudinal axis of rotation A centrally located therein as shown in greater detail in FIGS. 2 and 3. Support shaft 25 includes a depending handle 27 intermediate its ends which, in conjunction with grip 13, provides a means for manually supporting the hollow shaft 25 and for directing streams of pressurized fluid outwardly from rotating nozzle assembly 29 onto the surface to be cleaned or stripped.

It is to be noted that the above gun 11 is one of many possible configurations of apparatus which can support rotating nozzle assembly 29 of the present invention. For example, gun 11 as described above powers rotation of rotating nozzle assembly 29 by rotation of powered rotary barrel or shaft 25, which is powered by an air supply, not shown. However, shaft 25 can be stationary, with rotating nozzle assembly 29 being self-rotating if some nozzle jets thereon are angled in a manner to impart rotation.

Figure 4:
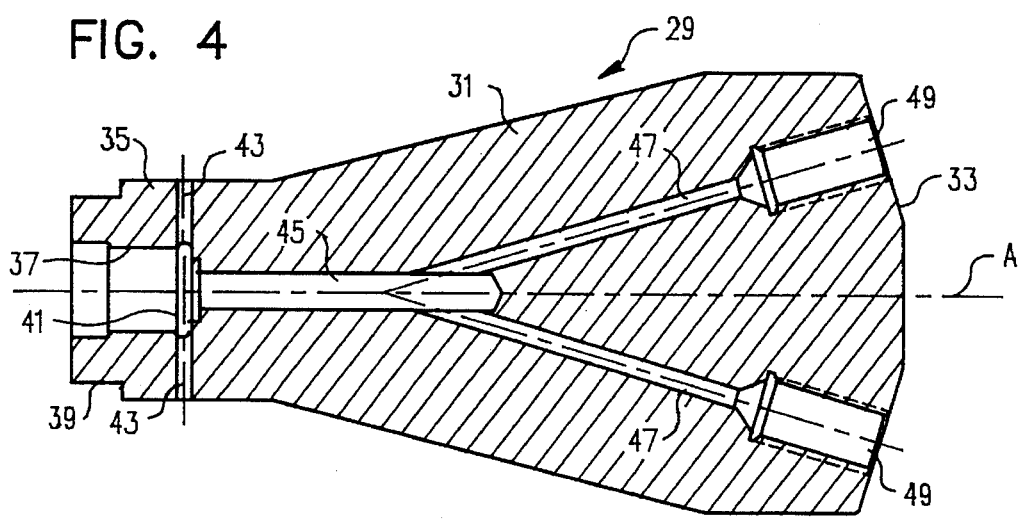
FIG. 4 is an exposed side view of the rotating nozzle of the present invention.

As shown in FIGS. 2 through 4, the rotating nozzle assembly 29 of the present invention includes a head 31 having a face 33 located on the front portion thereof. Collar 35 has a threaded opening 37 which is matable with the threaded exterior end of hollow shaft 25 of gun 11. Annular recess 39 on collar 35 is employed to further secure rotating nozzle assembly 29 to hollow shaft 25 of gun 11. Separating head 31, which is rotatable with respect to collar 35, is seal 41 which is located adjacent to bleed off passages 43. Main fluid passage 45 in head 31 communicates with threaded opening 37 in collar 35. Branching from main fluid passage 45 are jet passages 47 which connect main fluid passage 45 to jets 49. The angular, and preferably symmetrical, orientation of jets 49 on face 35 of head 31, to be discussed in more detail below, causes rotation of head 31 with respect to collar 35 as high pressure fluid passes through hollow tube 25 of gun 11, into threaded opening 37, through main fluid passage 45, into jet passage 47 and out of jets 49.

Figure 5:
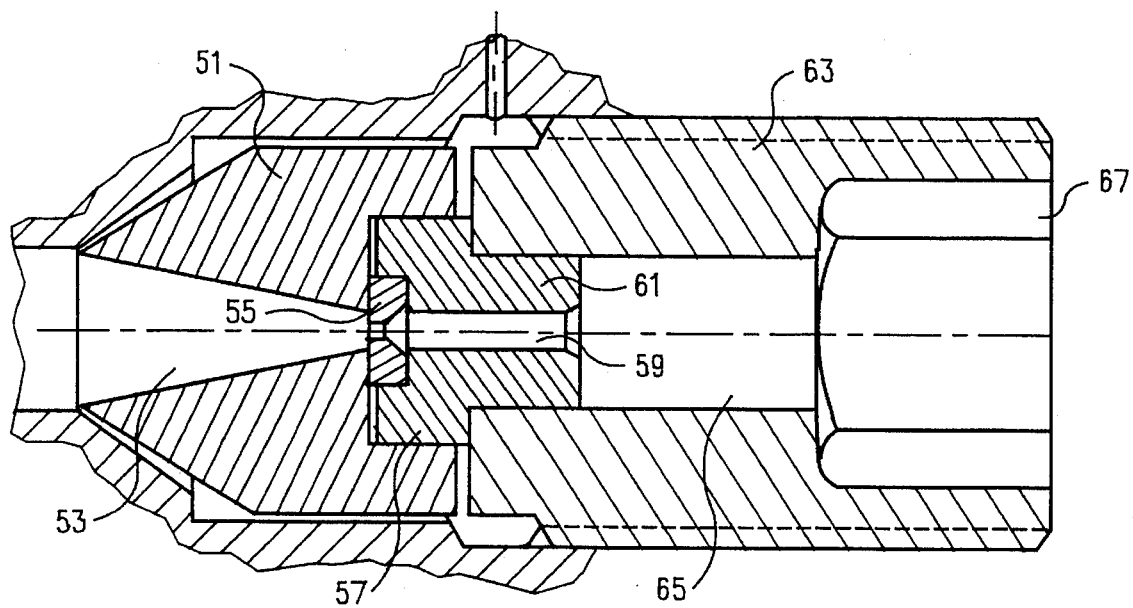
FIG. 5 is a detailed exposed view of a jet of the rotating nozzle of the present invention.

Referring next to FIG. 5, jets 49 each are comprised of jet collar 51 which has a frusto-conical passageway 53 therein with the base of the frusto-conical passageway communicating with jet passage 47 of head 31 and the apex of frusto-conical passageway 53 communicating with sapphire orifice 55, which is aligned with the aforesaid apex of frusto-conical passageway 53 by orifice holder 57. Orifice holder 57 has a central passage 59 therein which communicates with frusto-conical passageway 53. More specifically, central passage 59 passes through elongate portion 61 of orifice holder 57 which threadedly mates with retainer 63 such that central passage 59 of orifice holder 57 communicates with retainer passage 65. Retainer passage 65 communicates with hex pocket 67 through which the high pressure fluid ultimately passes after passing through retainer passage 65, central passage 59 of orifice holder 57, frusto-conical passageway 53, jet passage 47, main fluid passage 45 of head 31, threaded opening 37 of collar 35 and hollow tube 25 of gun 11.

Referring to FIG. 3, eight jets 49a through 49h are shown. Each of jets 49a through 49h is located at a specific distance from the centrally located longitudinal axis of rotation A of rotating nozzle assembly 29. More specifically, jets 49a and 49e are located distance $d_1$ from longitudinal axis A; jets 49b and 49f are located distance $d_2$ therefrom; jets 49c and 49g are located distance $d_3$ therefrom; and jets 49d and 49h are located distance $d_4$ therefrom. It is to be noted that all of distances $d_1$ through $d_4$ are different distances from centrally located longitudinal axis A such that a plurality of substantially circular concentric fluid streams emanate from rotating nozzle assembly 29, the number of which is a function of the number of different distances, $d_1 \ldots d_{1+x}$ at which jets 49a to 49a+x reside with respect to centrally located longitudinal axis A. Stated differently, each of jets 49a through 49h are located in one of four sets based on the distance of the particular jet 49a through 49h from centrally located longitudinal axis A, this distance being measured by $d_1$ through $d_4$. For example, set 1 is comprised of jets 49a and 49e, both distance $d_1$ from A, and set 4 is comprised of jets 49d and 49h, both distance $d_4$ from A. It is to be understood that the total number of sets comprised of jets 49a to 49a+x (where x is any number one or greater) can be any number from 2 to 20, such that more than one substantially circular jet stream is formed. It is also to be understood that the number of jets 49a through 49a+x located in each set can be from 1 to 20. Furthermore, distances $d_1$ through $d_{1+x}$ can range from a minimum of about 0.75 inches from A to a maximum of about 12 inches from A, and the incremental differences between each distance $d_1$ through $d_{1+x}$ can be from about 40 thousandths of an inch to about 120 thousandths of an inch, and preferably about 80 thousandths of an inch. It is to be noted that the spacing between the substantially circular concentric jet streams on the surface to be cleaned or stripped, which is of importance in the present invention for reasons discussed below, is a function of the distance of rotating nozzle assembly 29 from the work surface, the values for $d_1$ through $d_{1+x}$ for jets 49a to 49a+x, as well as the incremental differences between $d_1$ through $d_{1+x}$ for jets 49a to 49a+x.

Two embodiments of the present invention are contemplated, both of which encompass all of the above parameters. In the first embodiment, the jets 49 in each of the different sets are oriented at an acute angle that is different from the acute angle of the other jets located in all of the other sets. For example, referring again to FIG. 3, jets 49a and 49e, located in set 1, would both be oriented at an angle of eighteen degrees, jets 49b and 49f, located in set 2, would both be oriented at angles of sixteen degrees, jets 49c and 49g, both located in set 3, would both be oriented at fourteen degree angles, and jets 49*d* and 49*h*, both located in set 4, would be oriented at twelve degree angles. In this manner, the separate high pressure fluid streams from each of the sets of jets would first converge, then intersect, and finally diverge prior to impinging upon the surface to be cleaned or stripped in substantially circular concentric rings. The above unique angling of the jets results in the desired size of concentric circles with the desired spacing between the concentric circles to impinge on the work surface a greater distance from the rotatable nozzle assembly 29 than would be possible if the separate high pressure fluid streams did not first converge and intersect prior to diverging. It is to be understood that the above angles, twelve degrees through eighteen degrees, are merely exemplary, as are the two-degree angle increments. Any acute angle from about 6 degrees to about 30 degrees can be employed, as can increments between angles of from about 1 degree to about 10 degrees. Most preferably, distances $d_1$ through $d_{1+x}$ are inversely proportional to the size of the acute angles in the sets of jets 49*a* through 49*a+x* such that the set of jets having the largest angle (i.e., set 1 comprised of jets 49*a* and 49*e* having an eighteen degree angle) is the shortest distance (for example, $d_1$) from centrally located longitudinal axis A, and the set of jets having the smallest angle (for example, set 4 comprised of jets 49*d* and 49*h* having a twelve degree angle) is the greatest distance (for example, $d_4$) from the centrally located longitudinal axis A.

Figure 6:
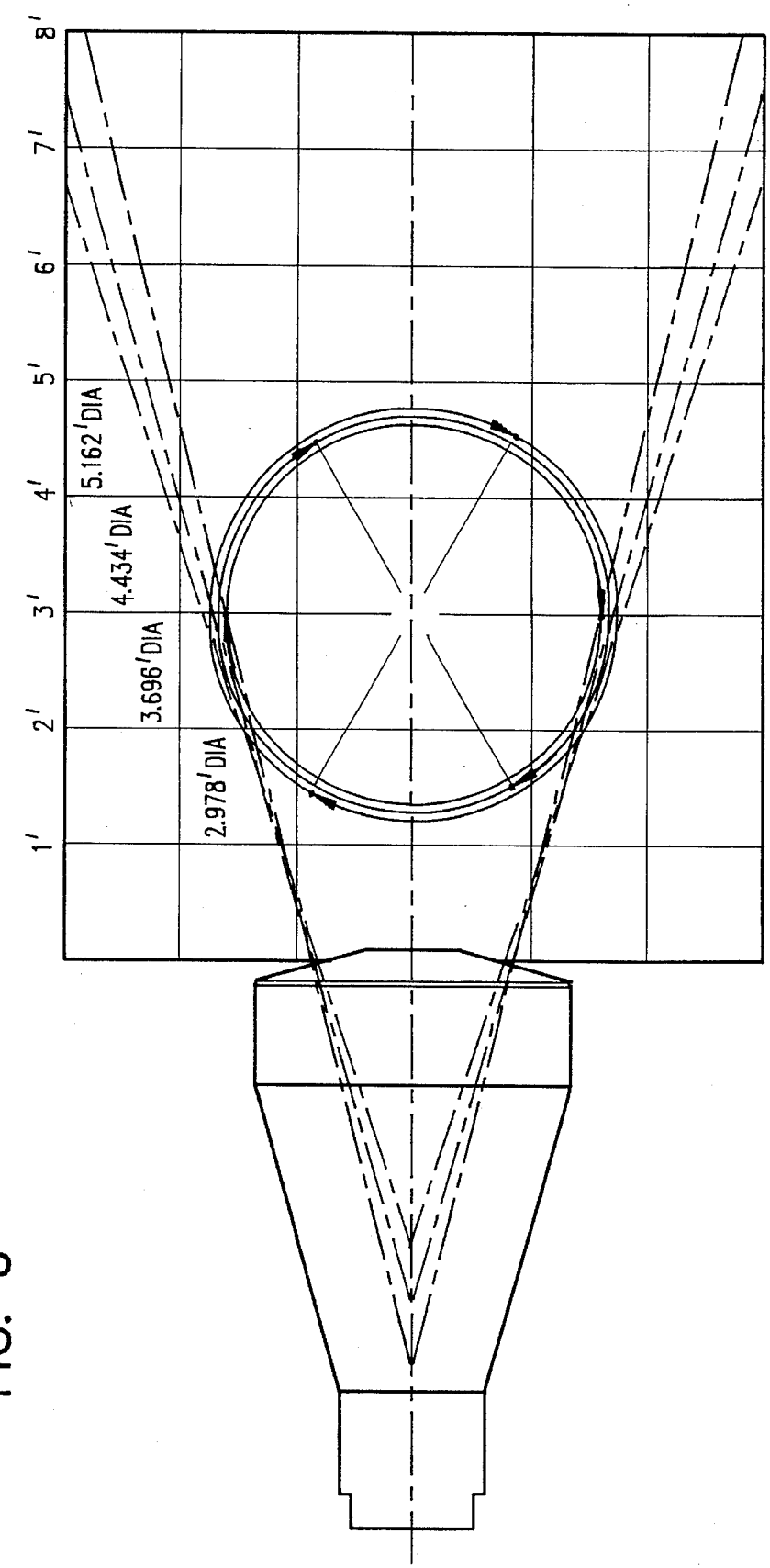
FIG. 6 is a schematic view of the crossover jet stream pattern produced by a rotating nozzle of the present invention having three sets of jets.

Referring to FIG. 6, an exemplary pattern of the separate high pressure fluid streams emanating from a nozzle configuration having three sets of jets is shown wherein the jets in each set are configured at an acute angle different from the acute angles of the jets in all of the other sets. As shown in FIG. 6, prior to intersection, the fluid stream from the set of jets oriented the greatest distance d from centrally located longitudinal axis A and having the smallest acute angle with respect to centrally located longitudinal axis A forms the outermost concentric circle. However, after intersection, this jet stream forms the innermost concentric circle.

Figure 7:
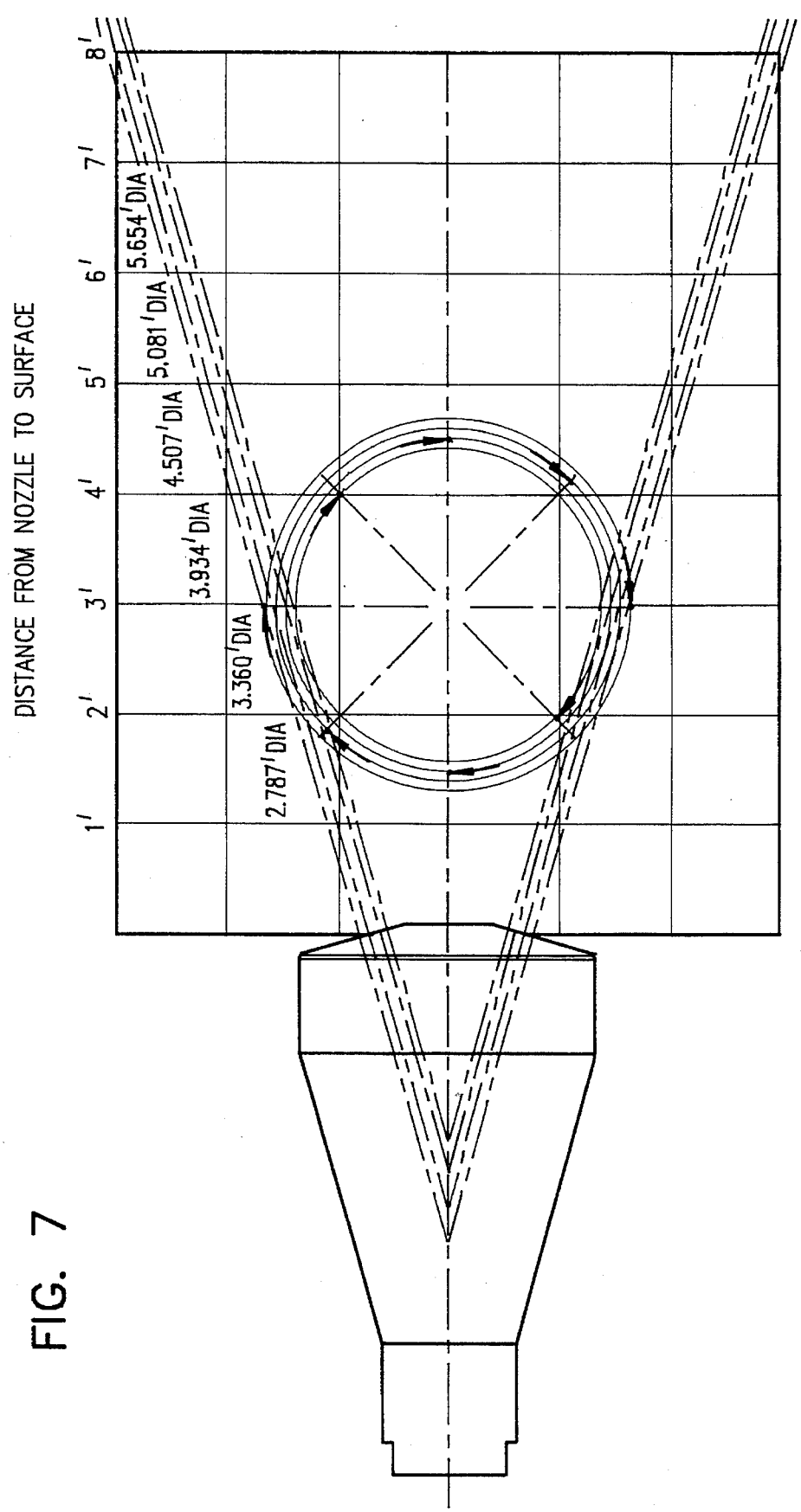
FIG. 7 is a schematic view of the non-crossover jet stream pattern produced by a rotating nozzle of the present invention having four sets of jets.

A second embodiment of the present invention is identical to the first embodiment with the sole exception that all of the jets 49*a* through 49*a+x* in all of the sets 1 through set 1+x are configured at substantially the same acute angle. In this manner, as shown in FIG. 7, the jet stream patterns only diverge, and never intersect or converge. FIG. 7 shows an exemplary nozzle having four sets of jets whereby all of the jets are oriented at about sixteen degrees with respect to centrally located longitudinal axis A. However, due to their different distances $d_1$ through $d_4$ from centrally located longitudinal axis A, their respective jet streams strike the work surface at different angles, such that substantially circular concentric jet stream patterns are formed. It is to be noted that the common angle at which all of the jets are oriented can be from about 6 degrees to about 30 degrees from centrally located longitudinal axis A, and preferably about 16 degrees to about 18 degrees.

Referring next to FIGS. 8*a* through 8*e* and FIGS. 9*a* through 9*e*, with reference to FIG. 3, the cleaning or cutting sequence of the separate high pressure fluid streams as they impinge upon the surface to be cleaned or stripped is shown. The sequence shown in FIGS. 8*a* through 8*e* and FIGS. 9*a* through 9*e* is applicable to both embodiments of the present invention, i.e., the first embodiment where each of the sets of the jets 49*a* through 49*a+1* is aligned at an acute angle different than the other sets of the jets 49*a* through 49*a+1* such that the separate high pressure fluid streams from each of the sets of jets first converge, then intersect and finally diverge prior to impinging upon the surface to be cleaned or stripped; as well as the second embodiment of the present invention wherein each of the jets 49*a* through 49*a+1* in each of the sets is aligned at substantially the same acute angle such that each of the separate high pressure fluid streams from each of the sets of jets only diverges and never intersects or converges with any of the other high pressure fluid streams.

Figure 8A:
FIGS. 8a through 8e are schematic side views of the jet stream cleaning or stripping pattern produced by a rotating nozzle of the present invention having four sets of jets taken at lines 8a through 8e of FIGS. 9a through 9e, respectively.
Figure 8B:
Figure 8C:
Figure 8D:
Figure 8E:
Figure 9A:
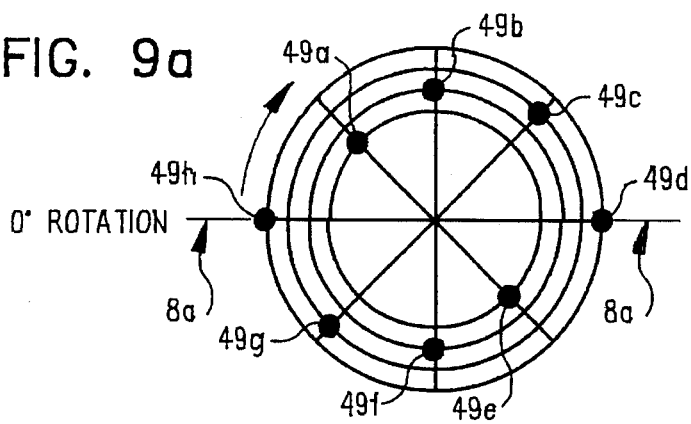

Assuming that the jet configuration as shown in FIG. 3 is employed, FIG. 8*a* and FIG. 9*a* show the initiation at 0 degrees rotation of the four concentric circles which will be formed by the four sets comprised of two jets each. Jets 49*a* and 49*e* in set 1 will form the innermost concentric circle, jets 49*b* and 49*f* in set 2 will form the concentric circle surrounding the innermost concentric circle, jets 49*c* and 49*g* in set 3 will form the concentric circle surrounding the one formed by jets 49*b* and 49*f*, and 49*d* and 49*h* of set 4 will form the outermost concentric circle. In FIGS. 8*a* and 9*a*, as well as in FIGS. 8*b* through 8*e* and 9*b* through 9*e*, note that not only are concentric circles being formed, but the high pressure fluid streams from the jets also widen these concentric circles and weaken the walls between adjacent concentric circles due to the angular deflection of the high pressure fluid streams after they strike the surface in concentric circular patterns such that the surface ridges between the concentric circles are removed in order that a jet stream pattern consisting of a single circle, as shown in FIGS. 8*e* and 9*e*, is ultimately formed.

Figure 9B:
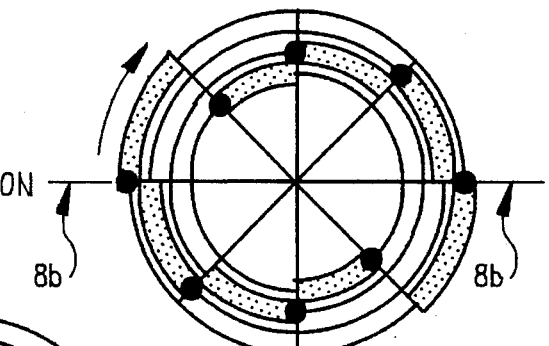

FIGS. 8*b* and 9*b* show the jet stream pattern after 45 degrees of rotation of rotating nozzle assembly 29. Note that two staggered lines have been formed, one consisting of the high pressure fluid streams from jets 49*a*, 49*b*, 49*c* and 49*d*, and another being formed from the high pressure fluid streams from jets 49*e*, 49*f*, 49*g* and 49*h*.

Figure 9C:
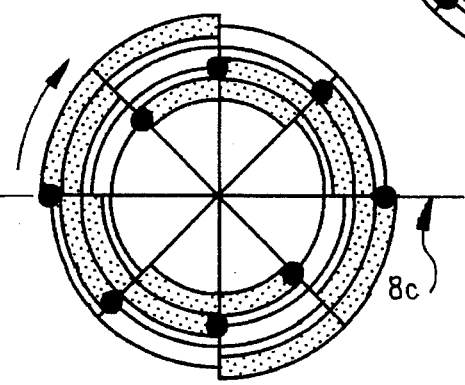

Referring to FIGS. 8*c* and 9*c*, after 90 degrees of rotation of rotating nozzle assembly 29, the first substantial portions of the surface have been cleaned or stripped by the weakening and removing of surface ridges between adjacent concentric circles due to angular deflection of the high pressure fluid streams after impinging in circular patterns on the surface to be cleaned or stripped. More specifically, portions of the following pairs of high pressure fluid streams have cleaned or stripped sections of the surface such that these surface sections are now joined: 49*a* and 49*b*, 49*b* and 49*c*, 49*c* and 49*d*, 49*e* and 49*f*, 49*f* and 49*g*, and 49*g* and 49*h*.

Figure 9D:
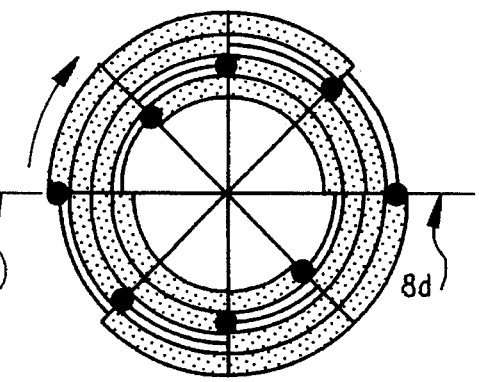
Figure 9D:
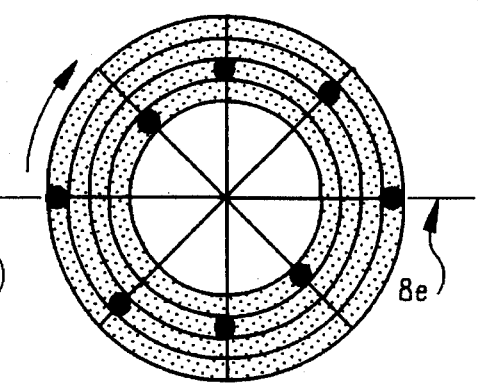

Referring next to FIGS. 8*d* and 9*d*, which show rotation of rotating nozzle assembly 29 through 135 degrees, the entire circular surface has been cleaned or stripped such that all of the arcuate segments formed by the high pressure fluid stream patterns of jets 49*a* through 49*h* are joined with the exception of a single 45 degree arcuate segment corresponding to each of jets 49*a* through 49*h*.

As shown in FIGS. 8*e* and 9*e*, which takes the rotating nozzle assembly 29 of the present invention through 180 degrees of rotation, the entire circular surface pattern has been cleaned or stripped by jets 49*a* through 49*h* of rotating nozzle assembly 29 such that the single 45 degree arcuate segment on the surface corresponding to each of jets 49*a* through 49*h* has now been cleaned or stripped as the high pressure fluid streams from each of jets 49*a* through 49*h* first impinge on the surface to complete each of the four concentric circles and then are angularly deflected from the surface to strike the surface ridges between concentric circles, thus weakening and destroying the last of these surface ridges in order to form a single circular pattern having an inner diameter formed by the concentric circle pattern caused by the high pressure fluid streams from set 1 comprised of jets 49a and 49e, and an outer diameter formed by the concentric circle of the high pressure fluid streams of set 4 of jets 49d and 49h. Moving rotating nozzle assembly 29 horizontally, vertically, diagonally, or circularly across the work surface will produce a plurality of overlapping rings of the type shown in FIG. 9e such that a substantially linear strip of the work surface is cleaned or stripped.

It should be understood that the above sequential description is only exemplary, and is dependent upon variables which include the relative hardness of the surface to be cleaned or stripped. If the surface, or the material to be cleaned therefrom is relatively soft, such as oil, the breaking out of the ridges between the concentric circles can occur in less than 360 degrees. However, if the surface, or material to be cleaned from the surface, is relatively hard, it may take more than 360 degrees of nozzle rotation for the ridges between the concentric circles to be removed. Another variable to be considered is nozzle rotation. The nozzle of the present invention can rotate between about 400 rpm and about 3500 rpm, with a preferable rpm value of about 2000 rpm. Yet another variable is the distance of rotating nozzle assembly 29 from the surface. Rotating nozzle assembly 29 can be from about 1 inch to about 10 inches away from the surface, and is preferably about 4 inches away from the surface when cleaning or stripping is attempted. Yet another variable to be considered is fluid pressure. As stated above, the rotating nozzle assembly 29 of the present invention is designed to operate from about 20,000 psi to about 45,000 psi. Applying the above variables, the concentric circular grooves cut in the surface, or in the material on the surface, can be from about 40 thousandths of an inch to about 120 thousandths of an inch in depth, and preferably about 40 thousandths of an inch in depth; and from about 20 thousandths of an inch to about 60 thousandths of an inch in width, preferably about 40 thousandths of an inch in width. Additionally, the number of sets of jets employed and the number of jets in each set are factors which also affect cleaning or stripping rate, as do the angle of the jets with respect to centrally located longitudinal axis A and the distances of the jets from centrally located longitudinal axis A, discussed above. Based on all of the above factors, the rotating nozzle assembly 29 of the present invention can travel linearly along the surface to be cleaned or stripped between about 30 inches per minute and about 600 inches per minute such that moving the nozzle horizontally across the work surface will produce a plurality of overlapping rings that result in cleaned or stripped surface, depending upon the fluid pressure and nozzle distance from the surface. It is important to note that increasing the distance between the nozzle and the work surface increases both the size of the concentric jet circles and the distance between these concentric jet circles thereby increasing the amount of work surface that can be cleaned in one pass. However, by increasing the distance between the nozzle and the work surface, the force of the fluid is decreased and tougher deposits may not successfully be removed in one pass.

While particular embodiments of the present invention have been described in some detail herein above, changes and modifications may be made in the illustrated embodiments without departing from the spirit of the invention.

I claim:

1. A rotating nozzle for use in cleaning or stripping a surface comprising:

a head adapted to be mounted on, and rotatable around, a high pressure fluid gun, said head having a longitudinal axis, a face with a center, and a fluid conduit therein; and at least two sets of jets on said face of said head, said jets communicating with said fluid conduit for passage of high pressure fluid through said head and said jets, each of said sets having at least one jet, each of said sets of jets being disposed at an acute angle from the longitudinal axis of said head, each of said sets of jets being disposed at a different distance from the center of said face, the distances of said sets of jets being selected such that rotation of said nozzle causes separate high pressure fluid streams from each of said sets of jets to impinge upon the surface to be cleaned or stripped in a number of substantially circular concentric jet stream patterns equivalent to the number of said sets of jets, the distances of said sets of jets from the center of said face further being selected such that entire areas of the surface between adjacent ones of the circular concentric jet stream patterns are also cleaned or stripped by the high pressure fluid streams after they initially impinge on the surface and as they are angularly deflected therefrom, wherein the acute angle of each of said sets of jets is different than the acute angle of the others of said sets of jets and the different distances of said sets of jets are inversely proportional to the size of the acute angles of said sets of jets such that said set of jets having the largest angle is the shortest distance from the center of said face and said set of jets having the smallest angle is the greatest distance from the center of said face such that the separate high pressure fluid streams from each of said sets of jets first converge, then intersect, and finally diverge prior to impinging upon the surface to be cleaned or stripped.

2. The nozzle of claim 1 wherein the different angles of said sets of jets are selected from between about six degrees and about thirty degrees.

3. The nozzle of claim 1 wherein three sets of jets are present, each of said sets is comprised of two jets, and the acute angles of said sets of jets are about ten degrees, about twelve degrees, and about fourteen degrees respectively.

4. The nozzle of claim 1 wherein four sets of jets are present, each of said sets is comprised of two jets, and the acute angles of said sets of jets are twelve degrees, fourteen degrees, sixteen degrees and eighteen degrees respectively.

5. The nozzle of claim 1 wherein the number of said sets of jets is selected from two, three, four, five and six.

6. The nozzle of claim 1 wherein the number of said jets in each set is selected from one, two, three, four, five and six.

7. The nozzle of claim 1 wherein each of said jets in a given one of said sets is symmetrically disposed on said face with respect to the others of said jets in said given set such that said head is balanced during rotation.

8. A rotating nozzle for use in cleaning or stripping a surface comprising:

a head adapted to be mounted on, and rotatable around, a high pressure fluid gun, said head having a longitudinal axis, a face with a center, and a fluid conduit therein; and at least two sets of jets on said face of said head, said jets communicating with said fluid conduit for passage of high pressure fluid through said head and said jets, each of said sets having at least one jet, each of said sets of jets being disposed at an acute angle from the longitudinal axis of said head, each of said sets of jets being disposed at a different distance from the center of said face, the distances of said sets of jets being selected such that rotation of said nozzle causes separate high pressure fluid streams from each of said sets of jets to impinge upon the surface to be cleaned or stripped in a number of substantially circular concentric jet stream patterns equivalent to the number of said sets of jets, the distances of said sets of jets from the center of said face further being selected such that entire areas of the surface between adjacent ones of the circular concentric jet stream patterns are also cleaned or stripped by the high pressure fluid streams after they initially impinge on the surface and as they are angularly deflected therefrom, wherein the acute angle of each of said sets of jets is different than the acute angle of the others of said sets of jets and the different distances of said sets of jets are inversely proportional to the size of the acute angles of said sets of jets such that said set of jets having the largest angle is the shortest distance from the center of said face and said set of jets having the smallest angle is the greatest distance from the center of said face such that the separate high pressure fluid streams from each of said sets of jets first converge, then intersect, and finally diverge prior to impinging upon the surface to be cleaned or stripped, wherein each of said jets in a given one of said sets is symmetrically disposed on said face with respect to the others of said jets in said given set such that said head is balanced during rotation.

9. The nozzle of claim 8 wherein the different angles of said sets of jets are selected from between about six degrees and about thirty degrees.

10. The nozzle of claim 8 wherein three sets of jets are present, each of said sets is comprised of two jets, and the acute angles of said sets of jets are about ten degrees, about twelve degrees, and about fourteen degrees respectively.

11. The nozzle of claim 8 wherein four sets of jets are present, each of said sets is comprised of two jets, and the acute angles of said sets of jets are twelve degrees, fourteen degrees, sixteen degrees and eighteen degrees respectively.

12. The nozzle of claim 8 wherein the number of said sets of jets is selected from two, three, four, five and six.

13. The nozzle of claim 8 wherein the number of said jets in each set is selected from one, two, three, four, five and six.

* * * * *